United States Patent
Hayashi

(10) Patent No.: US 7,854,390 B2
(45) Date of Patent: Dec. 21, 2010

(54) EXPANSION VALVE, HEAT PUMP TYPE REFRIGERATION CYCLE APPARATUS, AND AIR HANDLING UNIT

(75) Inventor: Takahito Hayashi, Saitama (JP)

(73) Assignee: Kabushiki Kaisha Saginomiya Seisakusho, Tokyo (JP)

(*) Notice: Subject to any disclaimer, the term of this patent is extended or adjusted under 35 U.S.C. 154(b) by 426 days.

(21) Appl. No.: 12/128,933

(22) Filed: May 29, 2008

(65) Prior Publication Data
US 2009/0293519 A1    Dec. 3, 2009

(51) Int. Cl.
*F25B 41/04*    (2006.01)
*F25B 41/06*    (2006.01)

(52) U.S. Cl. .................... 236/92 B; 62/160; 62/222

(58) Field of Classification Search ............... 236/92 B; 62/159, 160, 205, 222; 251/129.01, 129.22
See application file for complete search history.

(56) References Cited

U.S. PATENT DOCUMENTS 4,372,486 A * 2/1983 Tomioka et al. ........... 236/92 B
6,354,510 B1 * 3/2002 Petersen .................... 236/92 B

FOREIGN PATENT DOCUMENTS

JP        H665915         8/1994
JP        2000266194      9/2000

* cited by examiner

*Primary Examiner*—Marc E Norman
(74) *Attorney, Agent, or Firm*—Reising Ethington P.C.

(57) ABSTRACT

A first expansion valve may be provided in an outdoor unit, and a second expansion valve may be provided in an indoor unit. A pipe line connects a first joint pipe of the first expansion valve and a second joint pipe of the second expansion valve. When a refrigerant flows in from the second joint pipe and flows out from the first joint pipe, the first and second expansion valves are in a full open state due to pressure of the refrigerant. When the refrigerant flows in from the first joint pipe and flows out from the second joint pipe, the first and second expansion valves are in semi-closed state (flow rate controlling state). In a cooling mode, the second expansion valve expands the refrigerant just before an indoor heat exchanger, and in a heating mode, the first expansion valve expands the refrigerant just before an outdoor heat exchanger. In both heating and cooling modes, a large amount of refrigerant may flow through the pipe line to reduce pressure loss.

3 Claims, 5 Drawing Sheets

ZERO PULSE

150 PULSES

EXPANSION VALVE, HEAT PUMP TYPE REFRIGERATION CYCLE APPARATUS, AND AIR HANDLING UNIT

FIELD OF THE INVENTION

The present invention relates to an expansion valve for controlling a flow rate of a refrigerant in a first flow direction of the refrigerant and for discharging the refrigerant in a second flow direction, a heat pump type refrigeration cycle apparatus using the expansion valve, and an air handling unit having the heat pump type refrigeration cycle apparatus.

BACKGROUND

Conventionally, in the heat pump type refrigeration cycle apparatus, an expansion valve is interposed between an outdoor heat exchanger and an indoor heat exchanger. In a cooling mode, a refrigerant from the outdoor heat exchanger is expanded by the expansion valve and guided to the indoor heat exchanger. In a heating mode, the refrigerant from the indoor heat exchanger is expanded by the expansion valve and guided to the outdoor heat exchanger. Various expansion valves to control the flow rate of the refrigerant for adapting to normal operation, defrosting operation, and dehumidifying operation are proposed (for example, Japanese Patent Application Unexamined Publication No. 2000-266194 and Japanese Patent Application Examined Publication No. H6-65915).

Incidentally, in many heat pump type refrigeration cycle apparatuses, the expansion valve is provided at the outdoor heat exchanger (outdoor unit) side. In this case, the refrigerant expanded by the expansion valve flows into the indoor heat exchanger via a long pipe line. Therefore, there is a problem that the expanded refrigerant is subject to pressure loss, and flow rate control by the expansion valve is difficult. The same is true in a case that the expansion valve is provided at the indoor heat exchanger side.

Accordingly, in at least one implementation, an expansion valve controls the flow rate at the indoor heat exchanger in the cooling mode, and controls the flow rate at the outdoor heat exchanger in the heating mode, and a heat pump type refrigeration cycle apparatus using the expansion valve.

SUMMARY OF THE INVENTION

An expansion valve is provided for controlling a flow rate of a refrigerant in a first flow direction of the refrigerant and for discharging the refrigerant in a second flow direction. In one implementation, the expansion valve includes:

a valve housing having a first port communicating with a cylindrical main valve chamber and with a side part of the main valve chamber, and a second port communicating with an end of the main valve chamber in an axial direction thereof;

a piston-shaped valve seat slidably disposed in the main valve chamber in the axial direction of the valve chamber, and having a sub valve chamber opposed to the second port in the main valve chamber, a valve port for connecting the sub valve chamber to the second port, and a connecting hole for always connecting the sub valve chamber to the first port;

a valve plug for opening and closing the valve port of the valve seat by moving relative to the valve seat in the axial direction; and a driving member for driving the valve plug in the axial direction, wherein in a case that the first port is under high refrigerant pressure and the second port is under low refrigerant pressure, a flow rate of the refrigerant flowing from the sub valve chamber through a path between the valve plug and the valve port is controlled by closing the second port with the valve seat seated around the second port due to differential pressure between the first and second ports and by controlling a position of the valve plug in the axial direction with the driving member, and wherein in a case that the first port is under low refrigerant pressure and the second port is under high refrigerant pressure by making the refrigerant flow reversely, the refrigerant is discharged to the first port via the second port and the main valve chamber, said second port is opened by moving the valve plug in the axial direction with the driving member and by separating the valve seat from the second port due to the differential pressure between the second and first ports.

A heat pump type refrigeration cycle apparatus is also disclosed in which a cooling mode and a heating mode is switched by reversing a flow direction of refrigerant. In one implementation, the refrigeration cycle apparatus includes:

two of the above-described expansion valves consisting of first and second expansion valves, and interposed between an indoor heat exchanger and an outdoor heat exchanger, wherein first ports of the expansion valves are connected to each other via a pipe line, and wherein a second port of the first expansion valve is connected to the outdoor heat exchanger at the outdoor heat exchanger side, and a second port of the second expansion valve is connected to the indoor heat exchanger at the indoor heat exchanger side.

There is also disclosed an air handling unit having the above-described heat pump type refrigeration cycle apparatus, wherein the first expansion valve is disposed in an outdoor unit together with the outdoor heat exchanger, and the second expansion valve is disposed in an indoor unit together with the indoor heat exchanger.

BRIEF DESCRIPTION OF THE DRAWINGS

These and other objects, features, and advantages of the present invention will become more apparent upon reading of the following detailed description along with the accompanied drawings, in which.

DETAILED DESCRIPTION OF PREFERRED EMBODIMENTS

Embodiments of an expansion valve, a heat pump type refrigeration cycle apparatus, and an air handling unit according to exemplary implementations of the present invention will be explained with reference to figures.

Figure 1:
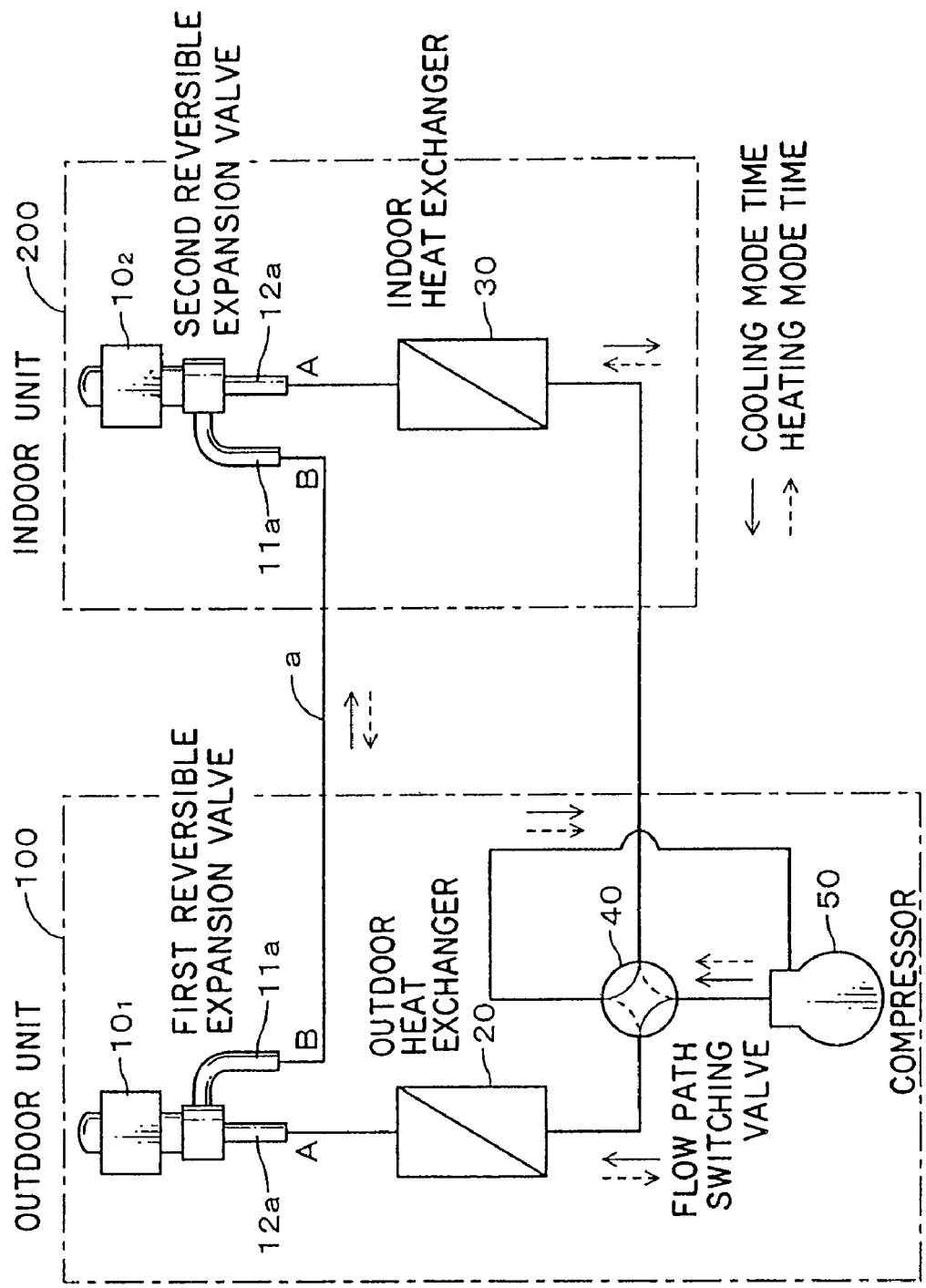
FIG. 1 is a schematic view showing a heat pump type refrigeration cycle apparatus according to an embodiment of the present invention.

As shown in FIG. 1, a first expansion valve $10_1$ is mounted on an outdoor unit 100, and a second expansion valve $10_2$ is mounted on an indoor unit 200. Further, an outdoor heat exchanger 20 is mounted on the outdoor unit 100, and an indoor heat exchanger 30 is mounted on the indoor unit 200. A flow path switching valve 40 and a compressor 50 are mounted on the outdoor unit 100. The expansion valves $10_1$, $10_2$, the outdoor heat exchanger 20, the indoor heat exchanger 30, the flow path switching valve 40 and the compressor 50 are connected as shown in FIG. 1, and compose the heat pump type refrigeration cycle apparatus. Incidentally, an accumulator, a pressure sensor, a thermal sensor and the like are not shown in FIG. 1.

The flow path switching valve 40 switches the flow path of the refrigeration cycle apparatus to a cooling mode or a heating mode. In the cooling mode as indicated by a solid-line arrow in FIG. 1, the refrigerant compressed by the compressor 50 flows from the flow path switching valve 40 to the outdoor heat exchanger 20, then flows via the first expansion valve $10_1$ and the pipe line "a" to the second expansion valve $10_2$. Then, the refrigerant is expanded by this second expansion valve $10_2$ and flows to the indoor heat exchanger 30. The refrigerant flowing into the indoor heat exchanger 30 flows into the compressor 50 via the flow path switching valve 40. On the other hand, in the heating mode as indicated by a dashed-line arrow in FIG. 1, the refrigerant compressed by the compressor 50 flows from the flow path switching valve 40 into the indoor heat exchanger 30, then flows via the second expansion valve $10_2$ and the pipe line "a" to the first expansion valve $10_1$. Then, the refrigerant is expanded by this first expansion valve $10_1$ and circulates to the outdoor heat exchanger 20, the flow path switching valve 40, and the compressor 50 sequentially.

The expansion valves $10_1$, $10_2$ are in a later-described fully open state not to control the flow rate of the refrigerant, or in a semi-closed state to control the flow rate of the refrigerant. In the fully open state, the refrigerant flows in from a later described joint pipe 12*a* at a side "A" and flows out to a joint pipe 11*a* at a side "B". Further, in the semi-closed state, the refrigerant flows in from the joint pipe 11*a* at a side "B" and flows out to the joint pipe 12*a* at a side "A". Namely, in the cooling mode, the first expansion valve $10_1$ is in the fully open state, and the second expansion valve $10_2$ is in the semi-closed state. Further, in the heating mode, the second expansion valve $10_2$ is in the fully open state, and the first expansion valve $10_1$ is in the semi-closed state. Accordingly, in the cooling mode, the outdoor heat exchanger 20 works as a condenser, and the indoor heat exchanger 30 works as an evaporator to cool a room interior. Further, in the heating mode, the outdoor heat exchanger 20 works as the evaporator, and the indoor heat exchanger 30 works as the condenser to heat the room interior.

Further, in the cooling mode, the second expansion valve $10_2$ expands the refrigerant just before the indoor heat exchanger 30, and in the heating mode, the first expansion valve $10_1$ expands the refrigerant just before the outdoor heat exchanger 20. In both the cooling and heating mode, a large amount of refrigerant flows through the pipe line "a" connecting the first expansion valve $10_1$ and the second expansion valve $10_2$. Therefore, pressure loss before the expansion valve having a flow rate control function is reduced, and running performance is improved.

Next, the first expansion valve $10_1$ and the second expansion valve $10_2$ according to one exemplary embodiment of the present invention will be explained with reference to FIGS. 2 and 3.

Figure 2:
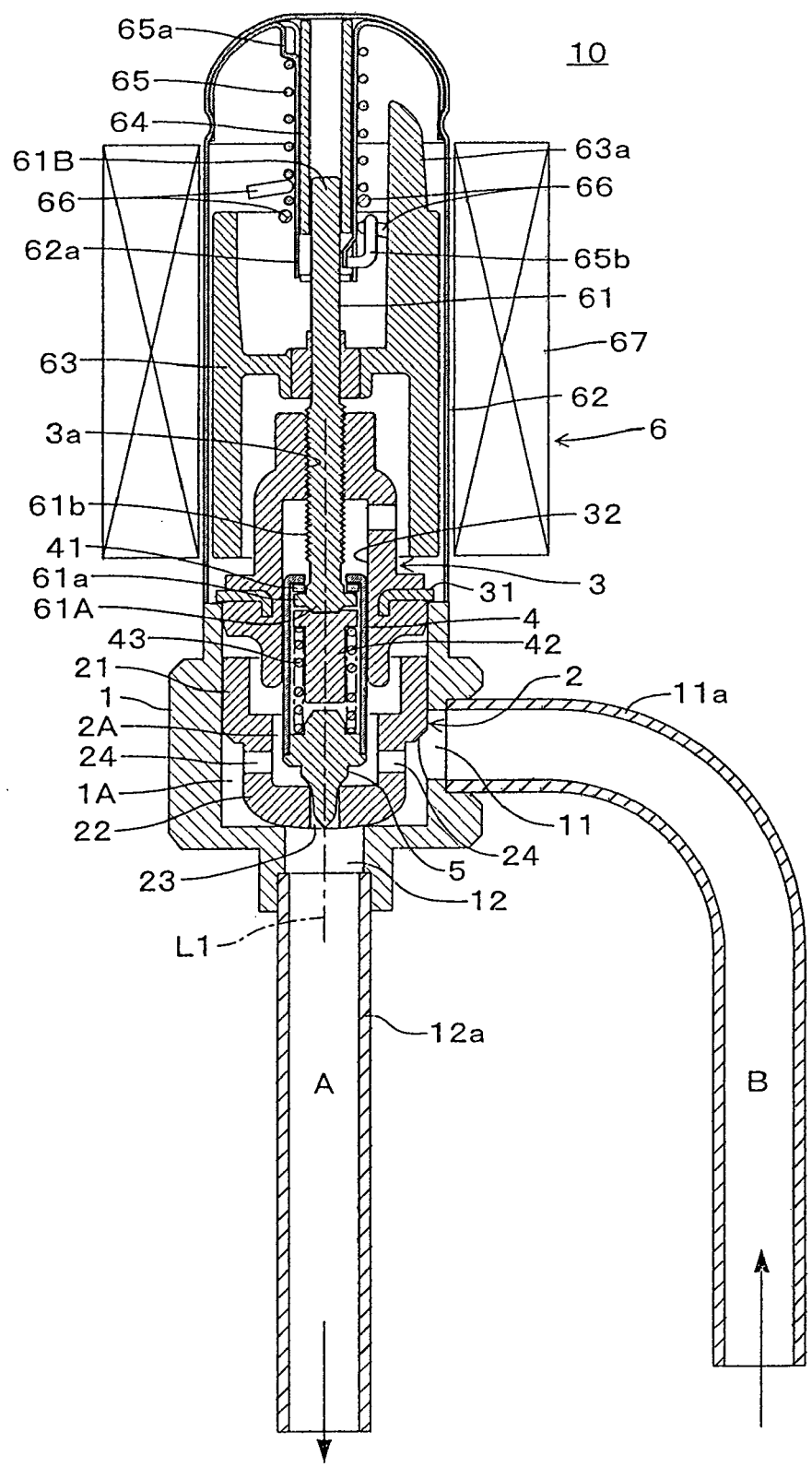
FIG. 2 is a vertical sectional view showing an expansion valve in a closed state according to the embodiment of the present invention.
Figure 3:
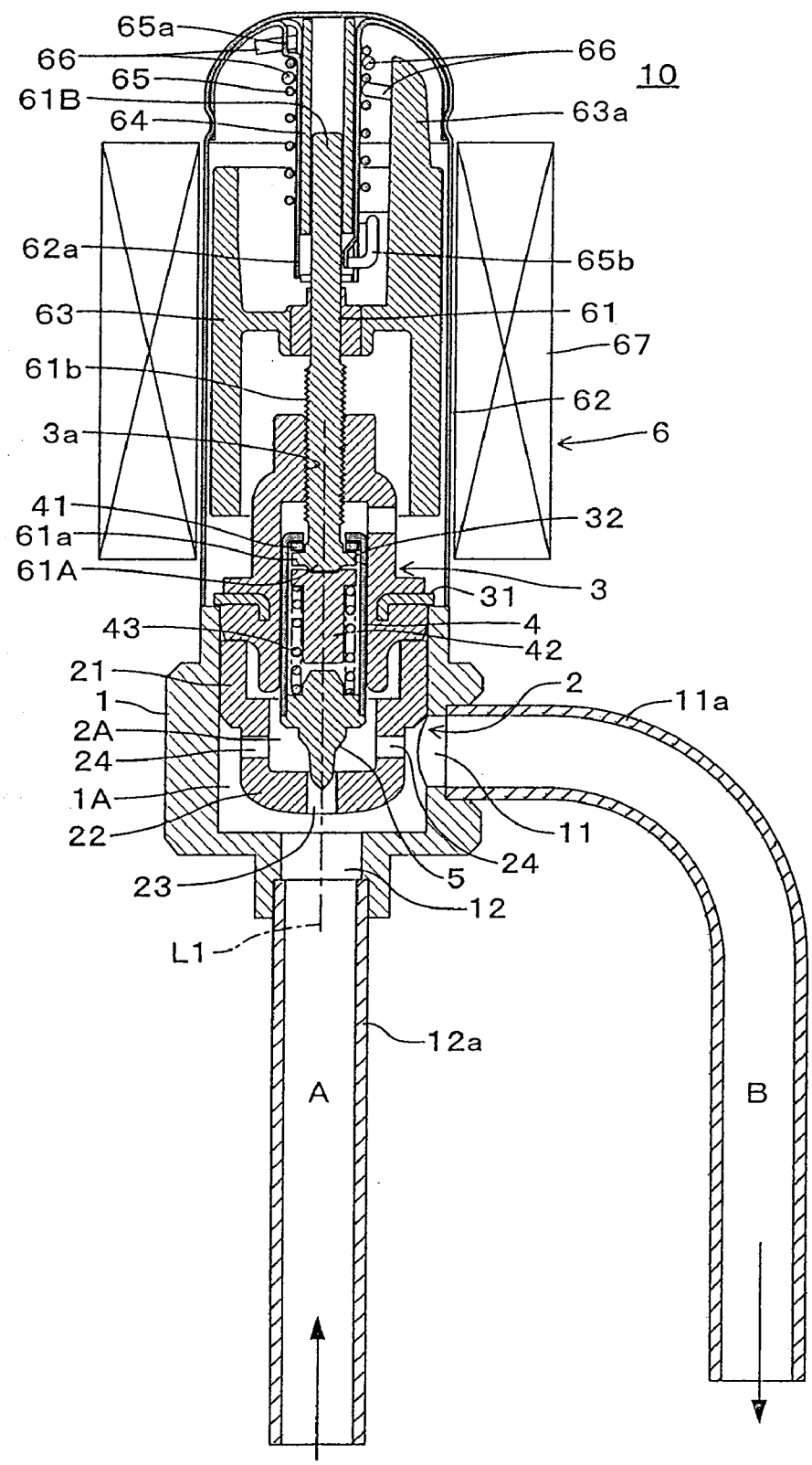
FIG. 3 is a vertical sectional view showing the expansion valve in a fully open state.

As shown in FIGS. 2 and 3, each of the first expansion valve $10_1$ and the second expansion valve $10_2$ (hereafter referred to as expansion valve 10) includes a valve housing 1. A cylindrical main valve chamber 1A, a first port 11 opened at an inner periphery of the main valve chamber 1A, and a second port 12 opened at an end of the main valve chamber 1A in a direction of an axis L1 are formed on the valve housing 1. The joint pipes 11*a*, 12*a* are respectively attached to the first port 11 and the second port 12.

A valve seat 2 is provided in the main valve chamber 1A. The valve seat 2 includes a large diameter part 21 having a large diameter about the axis L1 of the main valve chamber 1A, and a small diameter part 22. An inside of this small diameter part 22 is a sub valve chamber 2A. Further, a valve port 23 for connecting the sub valve chamber 2A to the second port 12, and a plurality of high pressure inlets 24 as connecting holes for constantly connecting the sub valve chamber 2A to the first port 11 are formed on the small diameter part 22. The valve seat 2 is formed in a piston shape. An outer periphery of the large diameter part 21 slidably abuts on the inner periphery of the main valve chamber 1A. The valve seat 2 slides on the main valve chamber 1A in the axis L1 direction. A relationship between a capacity coefficient $C_{24}$ of a valve of the high pressure inlets 24 and a capacity coefficient $C_{23}$ of a valve of the valve port 23 is $C_{24} > C_{23}$. Therefore, as described later, when the second port 12 is in high pressure, a differential pressure between the second port 12 and the sub valve chamber 2A separates the valve seat 2 from the second port 12.

A support member 3 is fixed to an upper side of the valve housing 1 with a fixing bracket 31. A long guiding hole 32 is formed on the support member 3 in the axis L1 direction. A cylindrical valve holder 4 is slidably fitted into the guiding hole 32 in the axis L1 direction. Thus, the valve holder 4 is movable relative to the valve housing 1 via the support member 3 in the axis L1 direction.

The valve holder 4 is coaxially arranged with the main valve chamber 1A. A valve plug 5 of which end is formed in a needle shape is fixed to a bottom of the valve holder 4 at the sub valve chamber 2A side. When the valve plug 5 and the valve holder 4 are moved in the sub valve chamber 2A of the valve seat 2 in the axis L1 direction, an opening space of the valve port 23 is increased or decreased. Thus, the flow rate of the refrigerant flowing from the first port 11 to the second port 12 is controlled. Incidentally, the valve plug 5 is movable in between a fully closed position as shown in FIG. 2 and a full open position as shown in FIG. 3.

The valve holder 4 is engaged with a rotor shaft 61 of a stepping motor 6 as a later-described driving member. Namely, a flange 61*a* is integrally formed on a lower end 61A of the rotor shaft 61. This flange 61*a* and an upper end of the valve holder 4 hold a washer 41. The lower end 61A of the rotor shaft 61 is rotatably engaged with the upper end of the valve holder 4. Owing to this engagement, the valve holder 4 is rotatably suspended by the rotor shaft 61. A spring bracket 42 is movably provided in the valve holder 4 in the axis L1 direction. A compression spring is provided in between the spring bracket 42 and the valve plug 5 under a predetermined load. Thus, the spring bracket 42 is pushed upward to abut on the lower end 61A of the rotor shaft 61.

A male thread 61*b* is formed on the rotor shaft 61. This male thread 61*b* is screwed into a female thread 3*a* formed on the support member 3. Thus, as the rotor shaft 61 is rotated, the rotor shaft 61 is moved in the axis L1 direction.

A case 62 of the stepping motor 6 is gas-tightly fixed to the upper end of the valve housing 1 by welding or the like. A magnet rotor 63 of which outer periphery is multi-magnetized is rotatably provided in the case 62. A rotor shaft 61 is fixed to the magnet rotor 63. A cylindrical guide 62*a* is suspended from a ceiling of the case 62. A cylindrical bearing 64 is provided inside the guide 62a. An upper end 61B of the rotor shaft 61 is rotatably fitted into the bearing 64.

A screw guide 65 attached to the outer periphery of the guide 62a and a movable stopper 66 screwed into the screw guide 65 are provided in the case 62. A projection 63a is formed on the magnet rotor 63. As the magnet rotor 63 is rotated, the projection 63a pushes the movable stopper 66, so that the movable stopper 66 is moved rotatingly up and down because the movable stopper 66 is screwed into the screw guide 65.

Owing to this vertical movement of the movable stopper 66, the movable stopper 66 abuts on a stopper 65a at an upper end of the screw guide 65, or a stopper 65b at a lower end of the screw guide 65 to open or close the expansion valve 10.

A stator unit 67 is mounted on an outer periphery of the case 62. The stepping motor 6 as the driving member rotates the magnet rotor 63 corresponding to a number of pulses of a pulse signal applied to a stator coil (not shown) of the stator unit 67. Owing to the rotation of the magnet rotor 63, the rotor shaft 61 is rotated and the rotor shaft 61 is moved in the axis L1 direction, so that the valve plug 5 and the valve holder 4 are moved in the axis L1 direction.

With the above-described structure, the expansion valve 10 operates as follows. FIG. 2 shows a state that the high pressure refrigerant flows in from the joint pipe 11a (a first port 11), then, the flow rate of the refrigerant is controlled, and then, the expanded refrigerant flows out from the joint pipe 12a (a second port 12). In this case, the first port 11, the main valve chamber 1A, the high pressure inlets 24, and the sub valve chamber 2A are under high pressure, and the second port 12 is under low pressure. Therefore, due to the differential pressure of the refrigerant between them, the valve seat 2 is seated around the second port 12 to close the second port. Then, when the stepping motor 6 controls the position of the valve plug 5 in the axis L1 direction, the flow rate of the refrigerant flowing from the sub valve chamber 2A via between the valve plug 5 and the valve port 23 is controlled.

On the other hand, the compressor 50 is stopped and the flow path switching valve 40 is switched. At this time, the stepping motor 6 controls to separate the valve plug 5 from the valve seat 2 (upward), and then the compressor 50 is started again. Thus, when the high pressure refrigerant flows in from the joint pipe 12a (second port 12), and the refrigerant flows out from the joint pipe 11a (first port 11), the second port 12 is under high pressure, and the main valve chamber 1A, the sub valve chamber 2A, and the first port 11 are under low pressure. Then, as shown in FIG. 3, the differential pressure separates the valve seat 2 from the second port 12, namely, the second port opens. Thus, the refrigerant flows via the second port 12 and the main valve chamber 1A and is discharged from the first port 11.

Figure 4A:
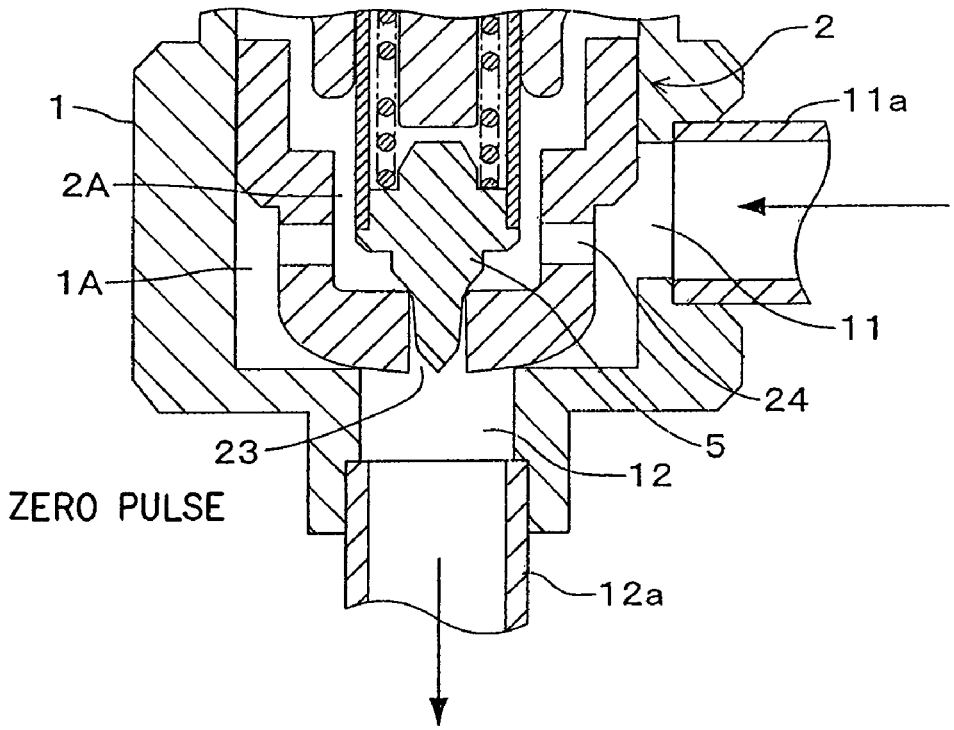
FIGS. 4A and 4B are schematic views showing a positional relationship between a valve plug and a valve seat when a flow rate of the expansion valve is controlled.
Figure 4B:
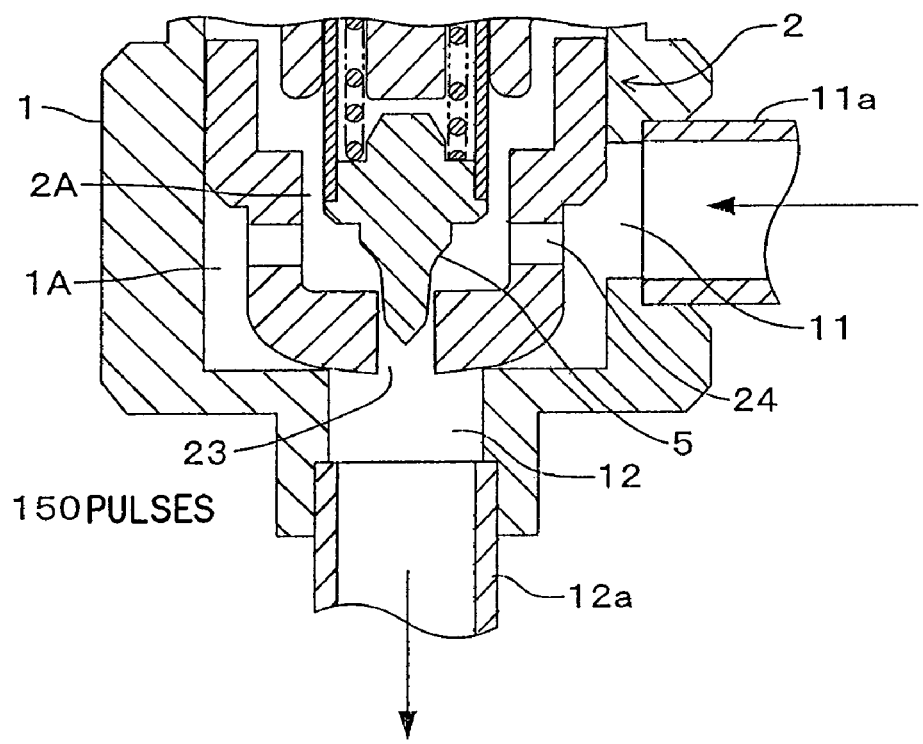
Figure 5A:
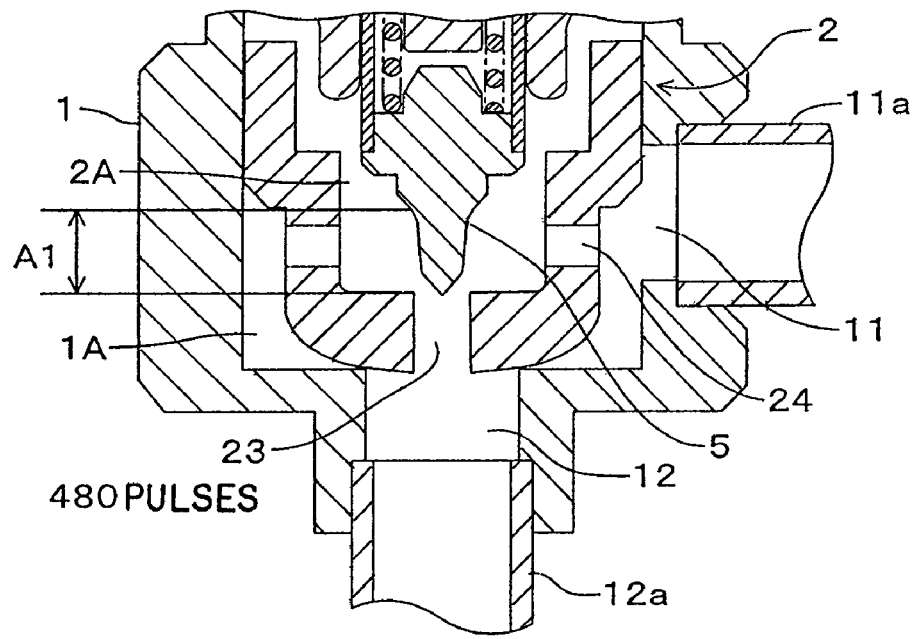
FIGS. 5A and 5B are schematic views showing a positional relationship between the valve plug and the valve seat when the expansion valve is fully open.
Figure 5B:
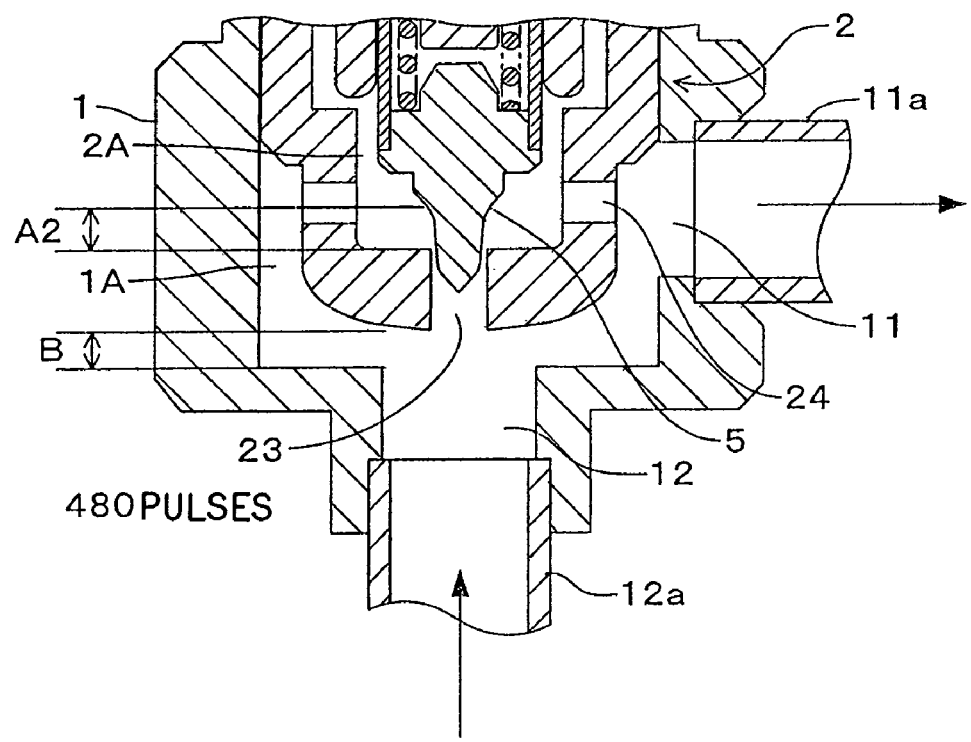

FIGS. 4A and 4B are schematic views showing a positional relationship between the valve plug 5 and the valve seat 2 when the flow rate is controlled, and FIGS. 5A and 5B are schematic views showing a positional relationship between the valve plug 5 and the valve seat 2 when the expansion valve is fully open. Incidentally, because the stepping motor 6 is driven by the pulse signals as described above, the number of rotation corresponds to the number of pulses of the pulse signals applied from a state that the valve plug 5 is at the lower end. FIG. 4A shows a state that the number of the pulse of the stepping motor 6 is zero, and the valve port 23 is closed by the valve plug 5. FIG. 4B shows a state that the number of the pulse is 150. The flow rate is controlled in a range of zero to 480 pulses. FIG. 5A shows a state just before a state shown in FIG. 3 that the compressor 50 is stopped, and the number of the pulse is 480 pulses to separate the valve plug 5 from the valve port 23. Then, after the flow path switching valve 40 is switched, and the compressor 50 is started again, the high pressure refrigerant flows in from the second port 12 and the valve seat 2 is separated from the second port 12 as shown in FIG. 5B. Incidentally, when a clearance between the valve plug 5 and the valve seat 2 in FIG. 5A is set to "A1", and a clearance between the valve seat 2 and an area around the second port 12 is set to "B", the expansion valve 10 is so designed that A1>B. Therefore, even when the valve seat 2 is separated and the upper end of the valve seat 2 abuts on the support member 3, namely, the valve seat 2 is at the highest position, there is a clearance A2 between the valve plug 5 and the valve seat 2, and the valve plug 5 never bite the valve port 23.

Thus, the expansion valve 10 can be both in a full open state (FIG. 3) not to control the flow rate, and in a semi-closed state (FIG. 2) to control the flow rate of the refrigerant. Therefore, the two expansion valves $10_1$, $10_2$ in the heat pump type refrigeration cycle apparatus shown in FIG. 1 are realized. Therefore, in the heat pump type refrigeration cycle apparatus, a large amount of refrigerant flows through the pipe line "a" in both cooling and heating modes, and the pressure loss is reduced.

Although exemplary embodiments of the present inventions have been fully described by way of example with reference to the accompanying drawings, it is to be understood that other embodiments, and various changes and modifications will be apparent to those skilled in the art. Therefore, unless otherwise such changes and modifications depart from the scope of the present invention hereinafter defined, they should be construed as being included therein.

What is claimed is:

1. An expansion valve for controlling a flow rate of a refrigerant in a first flow direction of the refrigerant and for discharging the refrigerant in a second flow direction, said expansion valve comprising:

a valve housing having a first port communicating with a cylindrical main valve chamber and with a side part of the main valve chamber, and a second port communicating with an end of the main valve chamber in an axial direction thereof;

a piston-shaped valve seat slidably disposed in the main valve chamber in the axial direction of the valve chamber, and having a sub valve chamber opposed to the second port in the main valve chamber, a valve port for connecting the sub valve chamber to the second port, and a connecting hole for always connecting the sub valve chamber to the first port;

a valve plug for opening and closing the valve port of the valve seat by moving relative to the valve seat in the axial direction; and a driving member for driving the valve plug in the axial direction, wherein when the first port is under high refrigerant pressure and the second port is under low refrigerant pressure, a flow rate of the refrigerant flowing from the sub valve chamber through a path between the valve plug and the valve port is controlled by closing the second port with the valve seat seated around the second port due to differential pressure between the first and second ports and by controlling a position of the valve plug in the axial direction with the driving member, and when the first port is under low refrigerant pressure and the second port is under high refrigerant pressure by making the refrigerant flow reversely, the refrigerant is discharged to the first port via the second port and the main valve chamber, said second port is opened by moving the valve plug in the axial direction with the driving member and by separating the valve seat from the second port due to the differential pressure between the second and first ports.

2. A heat pump type refrigeration cycle apparatus in which a cooling mode and a heating mode is switched by reversing a flow direction of refrigerant, said refrigeration cycle apparatus comprising:

two expansion valves each having:
- a valve housing with a first port communicating with a cylindrical main valve chamber and with a side part of the main valve chamber, and a second port communicating with an end of the main valve chamber in an axial direction thereof;
- a piston-shaped valve seat slidably disposed in the main valve chamber in the axial direction of the valve chamber, and having a sub valve chamber opposed to the second port in the main valve chamber, a valve port for connecting the sub valve chamber to the second port, and a connecting hole for always connecting the sub valve chamber to the first port;
- a valve plug for opening and closing the valve port of the valve seat by moving relative to the valve seat in the axial direction; and
- a driving member for driving the valve plug in the axial direction,
- wherein when the first port is under high refrigerant pressure and the second port is under low refrigerant pressure, a flow rate of the refrigerant flowing from the sub valve chamber through a path between the valve plug and the valve port is controlled by closing the second port with the valve seat seated around the second port due to differential pressure between the first and second ports and by controlling a position of the valve plug in the axial direction with the driving member, and
- when the first port is under low refrigerant pressure and the second port is under high refrigerant pressure by making the refrigerant flow reversely, the refrigerant is discharged to the first port via the second port and the main valve chamber, said second port is opened by moving the valve plug in the axial direction with the driving member and by separating the valve seat from the second port due to the differential pressure between the second and first ports, the expansion valves defining first and second expansion valves, and being interposed between an indoor heat exchanger and an outdoor heat exchanger, wherein first ports of the expansion valves are connected to each other via a pipe line, and wherein a second port of the first expansion valve is connected to the outdoor heat exchanger at the outdoor heat exchanger side, and a second port of the second expansion valve is connected to the indoor heat exchanger at the indoor heat exchanger side.

3. An air handling unit having the heat pump type refrigeration cycle apparatus as claimed in claim 2,
wherein the first expansion valve is disposed in an outdoor unit together with the outdoor heat exchanger, and the second expansion valve is disposed in an indoor unit together with the indoor heat exchanger.

* * * * *